G. W. FERRIS.
Ageing Liquors.
No. 56,197.
Patented July 10, 1866.
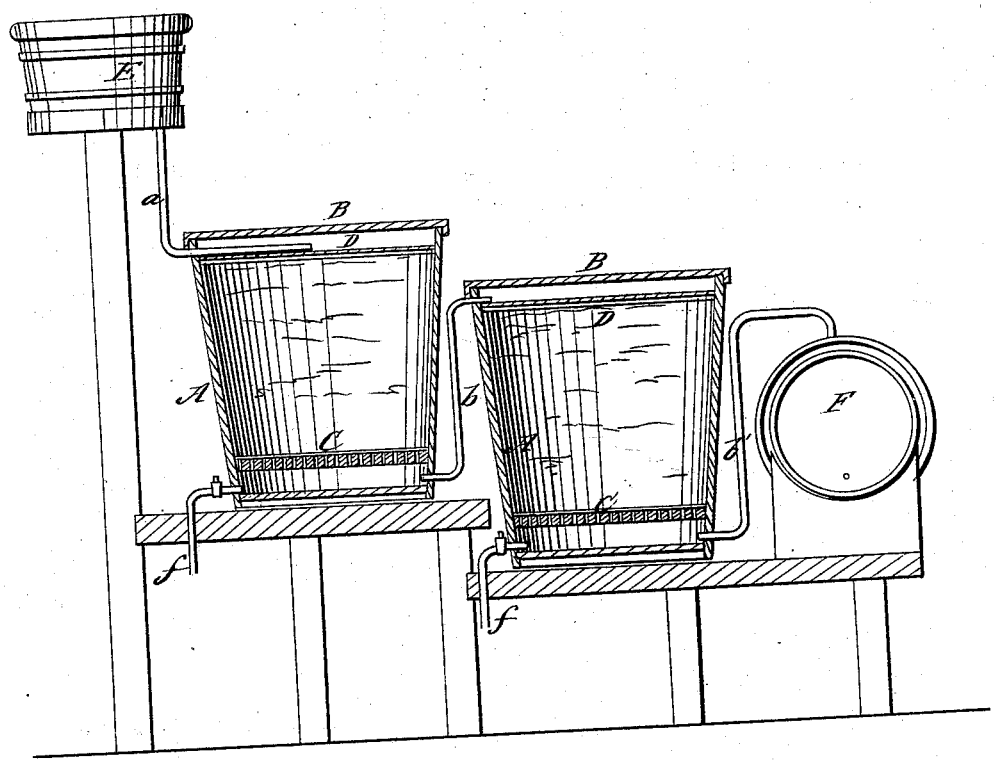
Witnesses:
Inventor:

UNITED STATES PATENT OFFICE.

G. W. FERRIS, OF QUINCY, ILLINOIS.

IMPROVEMENT IN REFINING SPIRITUOUS LIQUORS.

Specification forming part of Letters Patent No. 56,197, dated July 10, 1866.

*To all whom it may concern:*

Be it known that I, G. W. FERRIS, of Quincy, in the county of Adams and State of Illinois, have invented a new and useful Improvement in Refining Spirituous Liquors; and I do hereby declare that the following is a full, clear, and exact description thereof, which will enable others skilled in the art to make and use the same, reference being had to the accompanying drawing, forming a part of this specification.

The drawing represents a longitudinal vertical section of this invention.

This invention relates to a process of refining spirituous liquors, particularly whisky, which consists in passing such liquor through a series of tightly-closed tanks placed gradually lower and lower, and packed with charcoal in such a manner that the liquor is subjected to a certain pressure which causes the same to percolate freely through the coal, and while passing through the several layers of coal it is freed from all the fusel-oil and other impurities contained in it, and a pure spirit is obtained.

The apparatus which I use in carrying out my process is composed of a series of tanks, A, which are placed gradually lower and lower, as clearly shown in the drawing. Said tanks are provided with tightly-fitting covers B, which are closed down by screws or other means, so as to produce a tight joint, and they are also furnished with perforated false bottoms C, as shown.

When the tanks are to be used they are packed with charcoal, which may be pounded to a fine powder, and the top of the charcoal in each tank is covered by a sheet, D, of muslin or other textile fabric.

E is the supply-tank, from which extends a pipe, *a*, in the upper part of the first filtering-tank, and another pipe, *b*, extends from the bottom part of the first filtering-tank to the top of the second, and so forth, from one filtering-tank to the other, until the last tank in the series connects by a pipe, *b'*, with the cask or receiving-vessel F.

The charcoal in the several tanks is saturated with proof-spirit, and the liquor to be refined is caused to percolate through the entire series of filtering-tanks until it passes off to the receiving-vessel in a pure state.

While passing through the several filtering-tanks the liquor is subjected to a certain pressure caused by the column of liquor pressing on it, for it is obvious that if the tanks are all filled the liquor in the first filtering-tank is subjected to the pressure of the column in the supply-pipe *a*, that in the second filtering-tank to the same pressure, plus the pressure caused by the difference in the level of the first and second tanks, and so on, increasing the pressure to the last tank. By these means the liquor is caused to percolate freely through the several layers of charcoal, and the operation of refining can be performed in a comparatively short time and with little trouble and expense.

Suitable pipes *f*, extending from the lower parts of the various tanks, give a chance to try the liquor after the same has passed through each filtering-tank, and they also serve to let the water escape which is used in washing out the filtering material.

Having thus described my invention, I claim as new and desire to secure by Letters Patent—

1. The within-described process of refining spirituous liquors by passing the same, under pressure, through a series of filtering-tanks, substantially as set forth.

2. The arrangement of a series of filtering-tanks placed gradually lower and lower, and provided with tightly-fitting covers, and with connecting-pipes, substantially as and for the purpose described.

The above specification of my invention signed by me.

G. W. FERRIS.

Witnesses:
WM. F. MCNAMARA,
W. HAUFF.